Figure 1:
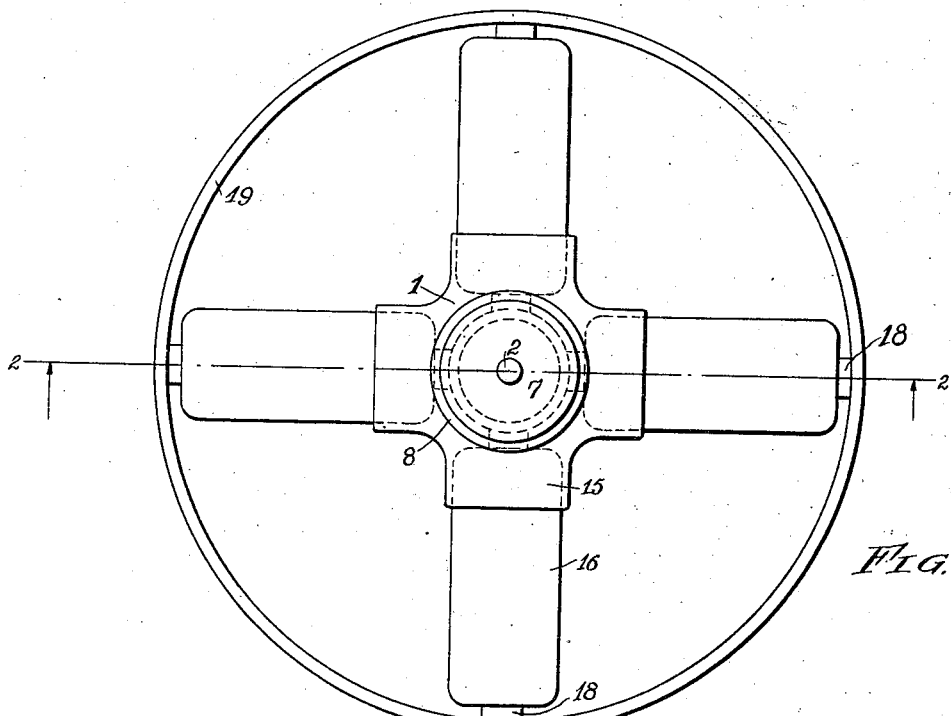

C. C. RUPRECHT.
PROCESS OF PURIFYING ELECTRICALLY CONDUCTIVE MATERIALS.
APPLICATION FILED APR. 20, 1908.

1,016,097.

Patented Jan. 30, 1912.

WITNESSES:
Arthur S. Remberg.
Brennan B. West.

INVENTOR,
Charles C. Ruprecht,
BY Bates, Fouts & Hull
ATTYS

UNITED STATES PATENT OFFICE.

CHARLES C. RUPRECHT, OF CLEVELAND, OHIO.

PROCESS OF PURIFYING ELECTRICALLY-CONDUCTIVE MATERIALS.

1,016,097.  Specification of Letters Patent.  Patented Jan. 30, 1912.

Application filed April 20, 1908. Serial No. 428,057.

*To all whom it may concern:*

Be it known that I, CHARLES C. RUPRECHT, a citizen of the United States, residing at Cleveland, in the county of Cuyahoga and State of Ohio, have invented a certain new and useful Improvement in Processes of Purifying Electrically-Conductive Materials, of which the following is a full, clear, and exact description, reference being had to the accompanying drawings.

This invention relates to a process of purifying electrically-conductive materials, such as metals and more particularly to purifying precious metals and lighter metals, such as aluminum.

It has for its object to provide a particularly simple and efficient process whereby impurities may be extracted from such materials and metals, leaving the latter substantially free from all foreign matter.

In carrying out my invention, I first melt or reduce to a semi-plastic or fluid condition the material to be purified, either by a source of heat external to the mold or by the use of a mold adapted to melt material placed therein. The outer portion of the mold constitutes in effect one electrode or terminal for an electric circuit, the other electrode or terminal being axially arranged with respect to the former. I then rotate the mold at a high rate of speed, while transmitting current through the molten or plastic mass from the central or inner electrode to the peripheral or outer electrode, or reversely. The centrifugal action imparted to the molten or semi-plastic material will carry to the outer periphery thereof all impurities which are of greater specific gravity than the material. Reversely, when the impurities are lighter than the material to be purified, the impurities will seek the centrally arranged electrode. In some cases, however, and particularly in the case of the lighter metals, such as aluminum, the density of the impurities is so nearly equal to the density of the metal to be purified that separation by centrifugal action alone will not readily occur. To facilitate such separation, I pass through the material in the direction of the exerted centrifugal force an electric current. This current, passing radially outwardly or inwardly from one electrode to the other through the molten or semi-plastic material, effectually separates the impurities. This separation is seemingly accompanied and facilitated in some instances by the progressive dissociation and reconstruction of the molecules of the material through which the current passes. The passage of the current, whether or not the electrolyte or menstruum be chemically affected by the current, causes the physical transfer of the impurities in the electrolyte or menstruum along the line of flow of the current. This results in carrying the particles of the impurities to the inner or the outer periphery of the mass, according to the direction of the current, delivering the impurities in the vicinity of the corresponding electrode. For the electrodes, I prefer to employ some relatively inert refractory material, such as carbon, platinum, or iron, between which the current will be distributed radially through the mass.

One apparatus for carrying out my process is illustrated in the drawing forming part hereof, wherein—

Figure 2:
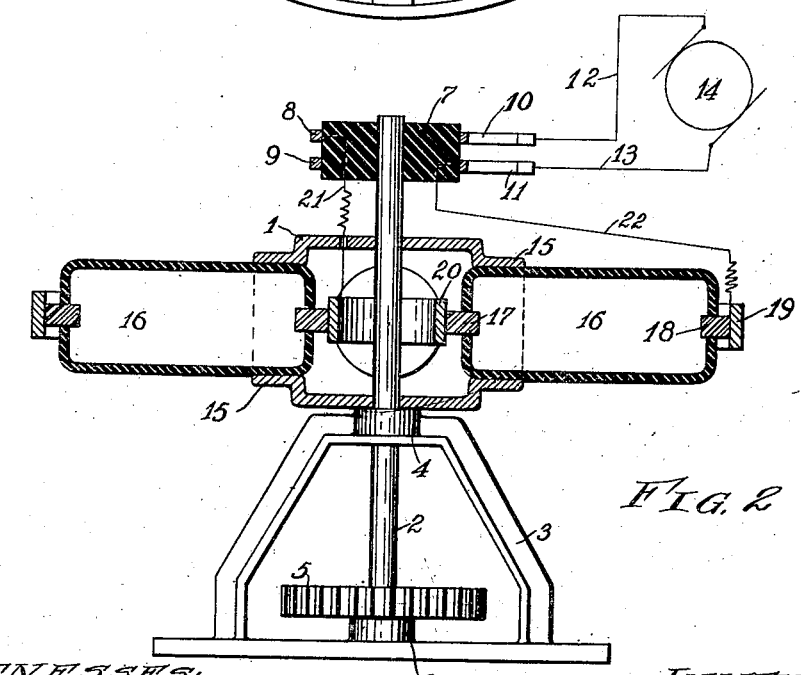

Figure 1 represents a top plan view of such apparatus, and Fig. 2 a central vertical sectional view, taken on the line 2—2 of Fig. 1.

In the aforesaid drawing, 1 represents a central mold-carrier which is rigidly connected to the shaft 2, said mold-carrier being supported by a suitable standard 3 in which the shaft is journaled, as shown at 4. This shaft is provided near its lower end with a drive gear 5 by means of which it may be rotated from any suitable source of power (not shown). The lower end of this shaft may be mounted in a bearing 6. Shaft 2 projects through the mold-carrier and is provided thereabove with a circular block 7 of insulating material having thereon a pair of contact rings 8 and 9.

10 and 11 denote a pair of brushes adapted to bear against said contact rings, said brushes being connected respectively by conductors 12 and 13 with a suitable source of electrical power 14.

The mold carrier 1 is provided with a series of radially projecting sleeves or hubs 15, each of which has securely fitted thereinto a mold 16. This mold is of refractory non-conducting material and is provided at its inner or axially located end with an electrode 17 and at its outer end with an electrode 18. The outer electrodes may be electrically connected by means of a ring 19 of conducting material, and the inner electrodes may be connected by a ring 20 of conducting material.

21 denotes an electrical conductor connecting ring 8 with ring 20, and electrodes 17, being insulated from carrier 1 in any suitable manner.

22 denotes an electrical conductor connecting ring 19 and electrodes 18 with ring 9.

With the parts arranged as described, the operation will be clear. The material to be purified is introduced into a mold, as through the electrode apertures; shaft 2 is rotated by means of gear 5 and current is supplied from the generator 14 to the suitable electrodes, either the inner or the outer, as conditions may require. When the impurities to be separated are heavier than the material to be purified, the current will be transmitted through such material from the inner to the outer electrode of each mold. When the impurities are lighter than the material to be purified, the current will be transmitted in a reverse direction, that is to say, from the outer electrode to the inner electrode of each mold. The impurities will collect at one end of the mold, leaving the purified material in the remaining portion of the mold. The passage of the current through the mass within the mold tends to maintain the mass in a molten or semi-plastic condition.

By the process and apparatus described herein, I am enabled to effectively and economically remove from electrically-conductive materials (whether metal or otherwise) impurities which, owing to their approximation in density to the density of such materials, cannot be removed by centrifugal action alone.

Having thus described my invention, I claim:

1. The process of purifying electrically conductive materials which consists in reducing the materials to a fluid condition, rotating the fluid mass, and passing an electric current radially through such mass.

2. The process of purifying electrically conductive materials which consists in reducing the same to a fluid condition, rotating the fluid mass to subject the same to centrifugal action and passing through the rotating mass a current in the direction of the exerted centrifugal force.

3. The process of purifying electrically-conductive materials which consists in reducing such materials to a molten or semi-plastic condition, rotating the molten or semi-plastic mass, and passing an electric current through such mass radially from the central portion thereof to the peripheral portion thereof.

4. The process of purifying electrically-conductive materials which consists in reducing such materials to a molten or semi-plastic condition, rotating the molten or semi-plastic mass to subject the same to centrifugal action and passing a current radially through such mass.

5. The process of purifying electrically-conductive materials which consists in reducing such materials to a molten or semi-plastic condition and passing an electric current through the molten or semi-plastic mass thus obtained, to drive the impurities toward one of the electrodes by means of which current is passed through such mass.

6. The process of purifying electrically conductive materials which consists in reducing to a molten or semi-plastic condition the material to be purified, rotating such material, passing through the material an electric current in the direction of the exerted centrifugal force produced by such rotation and maintaining such material in a molten or semi-plastic condition during the passage of the current therethrough.

In testimony whereof, I hereunto affix my signature in the presence of two witnesses.

CHARLES C. RUPRECHT.

Witnesses:
 J. B. HULL,
 A. J. HUDSON.